United States Patent [19]
Hill et al.

[11] Patent Number: 5,454,620
[45] Date of Patent: Oct. 3, 1995

[54] STRESSED-SKIN CARGO CARRIER

[75] Inventors: Dale R. Hill, Tomball; Donald G. Heden, Houston, both of Tex.

[73] Assignee: Ultra Lite Manufacturing, Inc., Houston, Tex.

[21] Appl. No.: 643,577

[22] Filed: Jan. 18, 1991

[51] Int. Cl.$^6$ ........................................... B60P 1/04
[52] U.S. Cl. ..................... 296/184; 298/17 R; 298/1 R
[58] Field of Search ............................. 296/184; 298/1 R, 298/1 A, 17 R; 105/261.2

[56] References Cited

U.S. PATENT DOCUMENTS

| | | | |
|---|---|---|---|
| 1,805,489 | 5/1931 | Kerr et al. | 296/184 |
| 1,883,936 | 10/1932 | Kerr | 298/17 R |
| 1,885,468 | 11/1932 | Nevin | 298/1 R |
| 2,140,590 | 12/1938 | Meininger | 296/184 |
| 2,861,837 | 11/1958 | Morse | 105/261.2 X |
| 2,910,322 | 10/1959 | Magor | 296/184 |
| 3,480,321 | 11/1969 | Brandt et al. | 296/184 |
| 3,814,479 | 6/1974 | Vornberger | 296/184 X |
| 3,844,616 | 10/1974 | Acker | 296/184 X |
| 3,897,972 | 8/1975 | Logue | 296/184 |
| 4,826,233 | 5/1989 | Hagenbuch | 296/184 X |
| 5,090,773 | 2/1992 | Guillaume | 296/184 X |

FOREIGN PATENT DOCUMENTS

| | | | |
|---|---|---|---|
| 148662 | 11/1980 | Japan | 296/184 |
| 2141077 | 12/1984 | United Kingdom | 296/184 |

*Primary Examiner*—Joseph Pape
*Attorney, Agent, or Firm*— D. Arlon Groves

[57] ABSTRACT

An ultralight yet extremely strong vessel without a circumferential support suitable for full-length, end-dumpable trailers, for railroad tank cars, highway tank trailer, refuse transportation vehicles and the like. High strength and minimum weight are achieved by arcuately stressing but light materials, by provision of longitudinal support members which may become an integral part of the vessel and, in open-top embodiments, by provision of a reinforcing member along an extended open edge of adequate horizontal moment of inertia and which may readily be pre-tensioned if desired. In the pre-tensioned embodiment, such to reinforcing member may cause the open-top vessel to bow inwardly before loading so as to compensate for the outward-tendency of such vessels constructed of elastic materials when loaded.

22 Claims, 5 Drawing Sheets

STRESSED-SKIN CARGO CARRIER

BACKGROUND OF THE INVENTION

This invention relates to lightweight, high strength, container/transporter systems suitable for handling a wide variety of bulk materials or fluids. The present invention is particularly suited for incorporation into a novel line of dump trucks, dump trailers, refuse collection and/or transportation vehicles, railroad cars and the like. It has important benefits in cost reduction and energy resource conservation, and significant benefits in reduction of environmental degradation When both energy costs and labor costs were but a fraction of today's costs, manufacturers typically simply built rectangular boxes to receive, transport and unload such materials. Although it was known that flat plates could resist less stress than similar plates formed into any of a great variety of shapes, early manufacturers simply added enough reinforcing members at enough locations to permit the flat plate, rectangular box designs to withstand the loads of the intended applications. The resulting product was extremely heavy and unnecessarily wasteful of both material and energy resources, both in the initial manufacture and in subsequent utilization.

With the rising real costs of energy for transportation, more and more manufacturers began to look for more efficient receiving, transporting and unloading systems. Some resorted to cutting steel railroad tank cars in half, but while this expedient typically permitted the use of fewer reinforcement members, the final product was still unnecessarily heavy and consumptive of expensive energy resources. Others resorted to a simple substitution of lighter weight materials in the old rectangular box, heavily reinforced designs. Still others looked for ways to reduce overall weight while maintaining the required strength through new designs.

Exemplary of the latter is the design of George Logue as shown in U.S. Pat. No. 3,897,972 issued 5 Aug. 1975. Logue discloses a 45° inclined flange joining the flat sidewalls and the flat floor and a plethora of longitudinal supports and cross buttresses. The weight-saving feature of Logue is the provision of tapered rather than full-sectioned side buttresses. It will be readily appreciated that the weight saving of the Logue design is slight. Similarly, U.K. Pat. No. 2141077 to John Lasker discloses a flat floor an edge portion of which has been formed at a 45° angle and reinforced by bottom rails. The floor comprises three pieces welded longitudinally and, with the two side pieces, constitutes a four-piece shell.

U.S. Pat. No. 3,844,616 issued 29 Oct. 1984 to Acker discloses a half-elliptical-bottomed dump body formed of sheet metal, presumably steel, and three arcuate sections joined, presumably by welding, to a pair of vertical side walls. The half-ellipse shape is obtained by forming the center arcuate section to a radius of curvature three times the length of the radii of curvature of the "corner" arcuate sections. Acker does not specify whether the three arcuate sections are formed separately and welded longitudinally the length of the body, or are formed in one piece and welded transversely to a plurality of similar shaped sections. In any event, although it is stated as an object of that invention to provide a construction not requiring stiffeners and bolsters, Acker found it necessary to incorporate a bolster on each side, substantially at the center of the shell, which extend from the top rail to almost the bottom of the shell. The absence of reinforcing supports would seem to preclude the use of lightweight metals such as aluminum for all but the shortest of shells.

U.S. Pat. No. 3,583,331 to Mowatt-Larssen and U.S. Pat. No. 4,909,564 to Pfiefer and Homing employ arcuate sections in rail cars and refuse vehicles, respectively, but both appear to employ non-symmetrical sections.

Every material available today has some inherent disadvantages. Materials lighter than steel tend to be harder to work with, more elastic and less rigid, and generally may not be welded so as to maintain the strength of the material across the region of the weld. Aluminum, for example, typically undergoes a reduction in yield and tensile strength in the neighborhood of from 30% to 45% when welded. Also, aluminum has such a high coefficient of elasticity - i.e., tends to "spring back" so much when formed - as to make this material difficult to work with conventionally.

Both steel and aluminum have been used in the construction of "round bottom" containers for dump trucks and trailers. However, due at least in part to the difficulty of forming metal in sections more than about twenty feet or so in length, such prior devices have incorporated multiple sections of plate joined by circumferential welds and, in most instances, reinforced by either partial or full circumferential ribs. Typically illustrative is a dump trailer manufactured by Fruehauf, one of the larger trailer manufacturers in the country; its model DRX-M2-30 may be seen to be comprised of four half-rounded sections welded circumferentially and, even though made of quarter-inch high-strength steel with a yield strength of 100,000 psi, is reinforced with at least partially circumferential ribs at the bottom of each circumferential weld. Further, a massive, fully circumferential rib is seen to reinforce the body very near the midsection and a large, heavy-duty partial frame is utilized from the massive circumferential rib back to the end of the trailer, i.e., for nearly half the length of the trailer. Although only 30 feet in length and 23 cubic yards capacity, the estimated weight of the trailer is some 13,750 lbs. Were aluminum to be substituted for steel in such a design, a similar large circumferential rib would be required to support the circumferential welds joining each section. Since the total weight of vehicle and payload is limited by law, each such large reinforcement member directly reduces the allowable payload, i.e., on a pound-for-pound basis. Further, since cost such vehicles travel at least as far in an unloaded condition as they do loaded, the greater the empty weight, the greater the unnecessary depletion of energy resources.

An aluminum-bodied trailer known in the trade as the 'bathtub' design has also been tried heretofore. This design incorporates multiple short sections of aluminum welded circumferentially and supported with multiple circumferential ribs. In cross-section, it has an appearance similar to that of a bathtub, i.e., flat bottom, straight sides, rounded corners. Despite its multiplicity of supporting circumferential ribs, however, and despite having been designed and manufactured by one of the nation's largest and most reputable manufacturers, this design is known for its propensity to break in half upon encountering harmonic loading during transit.

As best as can be determined by applicant, it appears that there is no fully satisfactory, truly lightweight end-dumpable trailer of full length and capable of transporting full loads on the market today, despite the long felt and pressing need therefor.

These and other disadvantages of the prior art are overcome with the present invention, however, and novel and improved techniques and apparatus are accordingly provided herein for more efficiently transporting products and at lower cost.

SUMMARY OF THE INVENTION

It is therefore a principal object of the present invention to provide significant weight savings without loss of strength and significant fuel savings at least when the invention is utilized in one of its over-the-road embodiments. It is a further object to provide a design for body shells which advantageously utilizes the maximum strength available for a given material and minimizes the overall weight of necessary supporting members.

It is still another object to provide an ultralight yet very strong body shell which may be utilized in any of a number of different embodiments, e.g., as an end-dumpable, full-length trailer; as a railroad tank car; as a highway tank trailer; as a refuse transportation vehicle and the like. It is a further object to provide, in the instance of over-the-road vehicles, body shells or portions of body shells which are streamlined, which have no interior corners to retain loads, and which have a minimum of surfaces capable of catching and transporting undesired small particles to be blown off at highway speeds.

It is a further object to provide a design which will possess sufficient rigidity even when highly elastic materials such as aluminum are used for constructing the body shells. Various novel means or combinations of means to achieve this object may be employed, as explained hereinbelow. It is still another object to provide a design which minimizes the amount of materials required to build body shells according to the precepts of the present invention.

It is yet another object of the present invention to provide a light but strong body design which requires no circumferential welds nor any circumferential reinforcing members.

The provision of automatically self-centering loading is still another object, as is on-center dumping in the dumpable embodiments of the present invention.

It is a further object lo concentrate wear in the dump trailer embodiment to a relatively narrow center plate which may be individually replaced, with concomitant savings of both natural and financial resources.

It is still a further object to provide a body shell with a smooth interior surface which may incorporate a plate of greater thickness at the location of greatest wear.

Significant weight and fuel savings may be expected from this invention. When embodied as a half-shell dumpable trailer, for example, a reduction in weight compared to conventional vehicles of from about 3,000 lbs. per trailer up to 6,000 lbs. per trailer may be expected, and fuel savings in excess of 10% may be realized. Weight savings for full-shell embodiments should be comparable.

These and other objects and features and advantages of the present invention will become apparent from the following detailed description, wherein reference is made to the figures in the accompanying drawings.

BRIEF DESCRIPTION OF THE DRAWINGS

The means by which the foregoing objects and features of novelty are achieved are pointed out with particularity in the claims forming the concluding portion of the specification. The invention, both as to its organization and manner of operation, may be further understood by reference to the following description with the following drawings.

Of the drawings.

DETAILED DESCRIPTION OF THE PREFERRED EMBODIMENT

Figure 1:
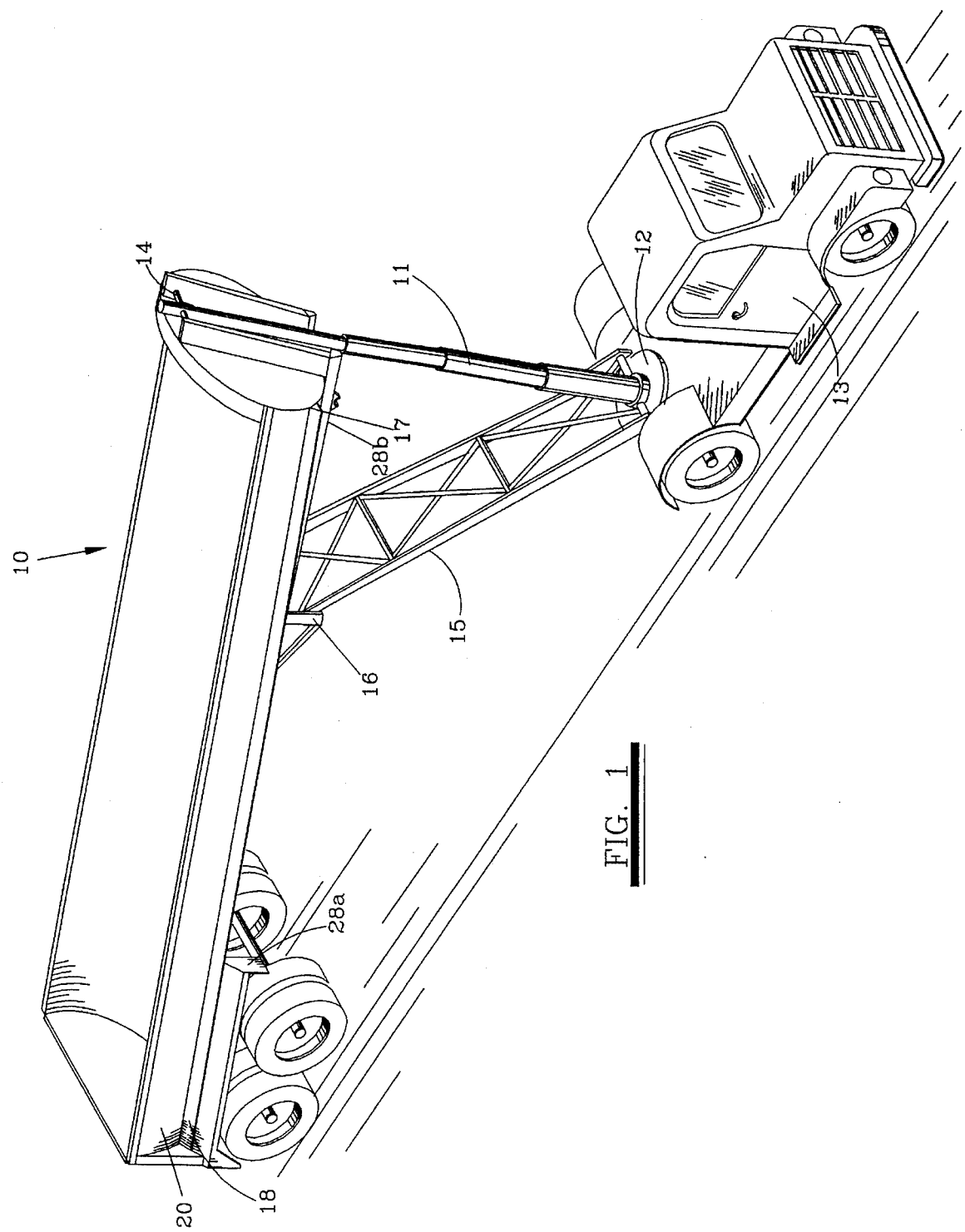
FIG. 1 is an isometric view of an end-dumping trailer embodiment of the present invention.

FIG. 1 is an isometric view of an end-dumping trailer embodiment of the present invention, shown in elevated position. It is to be noted that the illustration is of the type of trailer known in the trade as a 'frameless', 'shovel-nose' trailer; although the principles of the present invention may be applied equally well to other types of trailers, this is the preferred type. The absence of any circumferential welds, buttresses, or other forms of circumferential supports intermediate the ends of such body is also to be noted.

The end-dumpable trailer 10 of FIG. 1 may be seen to have been elevated by hydraulic cylinder 11, one end of which is supported by the fifth wheel 12 of tractor 13, and the other end of which supports and revolves around pin 14 very near the top of trailer 10. It is to be appreciated that this method of elevating the trailer permits the trailer to be raised from above the centerline of any load contained within the trailer 10. Consequently, any off-center loading of the cargo tending to cause rotation of the body while being elevated will have a decreasing moment arm as such body rotates slightly, providing intrinsic stability and resistance to increased rotation. For many applications, additional supports or reinforcing members may be needed if the precepts of the present invention are applied to a configuration whereby the loaded trailer 10 is elevated from below the centerline of the cargo. With such a configuration, as the body tends to rotate slightly the effective moment arm of even a slightly off-center load tends not only to increase but to increase rapidly, often at exponential rates, and sometimes disastrously so. It should be appreciated that such 'top lifting' will permit a greater reduction in the empty weight of the vehicle than other lifting configurations will permit.

Draft arms 15, also supported at one end by fifth wheel 12, provide additional means for increasing the resistance to rotation while unloading, as well as assisting the means for trailing the vehicle 10 behind tractor 13. The opposite end of draft arms 15 is pivotally supported about a pair of draft-arm hangars 16 depending from the side rails and the lower portion of the bottom plate of trailer 10.

Figure 2:
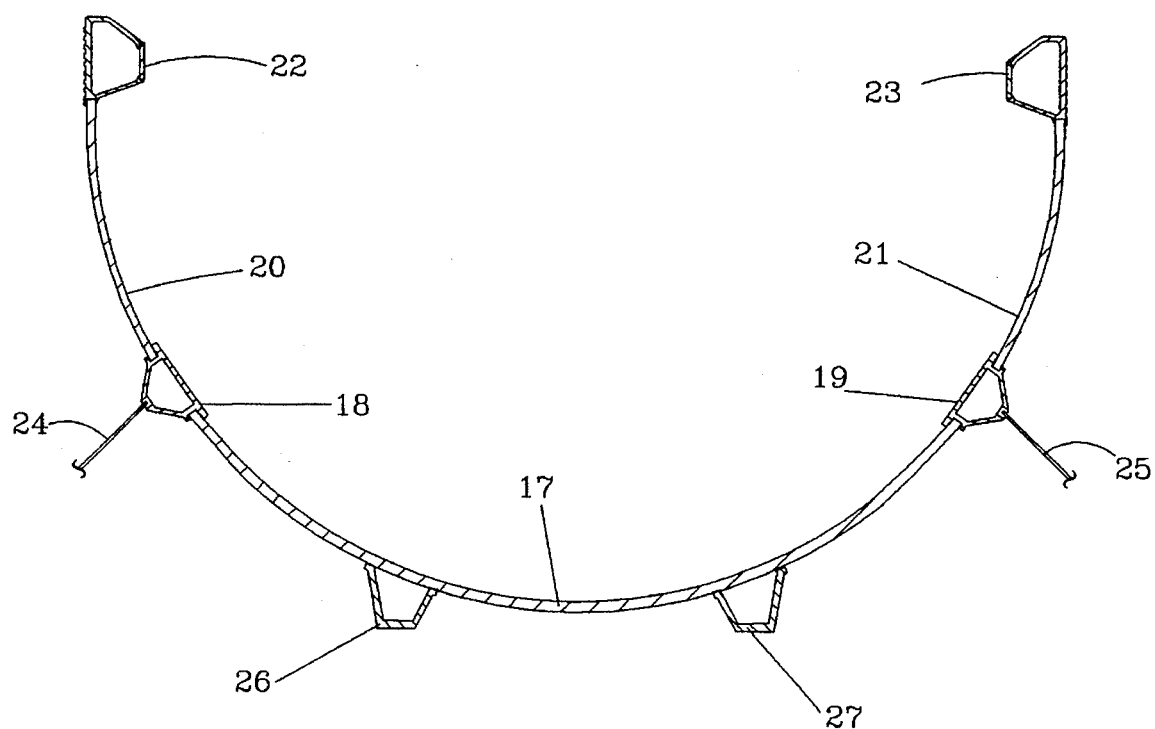
FIG. 2 is a schematic cross-sectional view of a three-plate body shell of the general configuration shown in FIG. 1.

As may be more clearly seen from FIG. 2, the configuration illustrated in FIG. 1 is a three-plate version of the present invention. Fabrication of such an open body may conveniently be initiated by rolling a full-length plate of lightweight but strong material of the desired thickness to the desired radius of curvature to form a bottom or floor plate 17. For a desired, final overall width of 8 feet and a plate thickness of 0.205 inch, a final radius of curvature of 4 feet less 0.50 inch is suitable. Examples of suitable light but strong materials include 5454-H34 aluminum alloy and 5083-H32 aluminum alloy. The latter is also commonly known as aluminum armor plate. Side rails 18 and 19 preferably extend the full length of the body and may preferably be extruded from 6061-T6 aluminum alloy. Although such components may be assembled by other techniques such as riveting and the like, a preferred form of assembling is by welding. Further, the design is particularly suitable for the application of automatic welding machines inasmuch as more than 90% of such welds may be performed by such automatic devices. If side rails 18 and 19 are to be welded, it is convenient for such rails to have overlapping lips so that lap welds may be readily and economically performed. Larger lips would of course be needed for riveting. It may be noted from the cross-sectional view of FIG. 2 that additional weight may be saved by integrating the pieces such that one surface of side rails 18 and 19 forms a portion of the interior surface of the body 10 rather than by having such surface overlapped by the plates forming the major portion of such body. Side plates 20 and 21 may preferably be formed of the same material as floor plate 17 and to the same or different thicknesses and to the same or different radii of curvature. Maximum strength for minimum material, however, may be achieved by stressing the plates to a constant radius.

Side plates 20 and 21 are shown reinforced by top rails 22 and 23, respectively. If desired, wheel fenders 24 and 25 may be readily and conveniently attached to the outer corners of side rails 18 and 19, or such fenders may be supported from the suspension. Bottom rails 26 and 27 are shown as discontinuous in cross-section, but for some applications, particularly where frequent replacement of the central portion of bottom plate 17 is contemplated, it may be preferable for such bottom rails to be formed in continuous cross-section, i.e., to overlap bottom plate 17 by the width of such rail. While bottom rails 26 and 27 may preferably be lengthwise continuous, or nearly so, for dump truck embodiments, they are not required for strength requirements even in full length (38-ft.), end-dumpable trailer embodiments. It is convenient, however, to support the suspension from bottom rails, and for that reason the preferred embodiment may include a pair of short bottom rails situated at the rear of the body. Additionally, it is convenient to position short bottom rails at the front of the body to provide additional support for the king-pin/saddle assembly of fifth wheel 12.

In any event, the interior formed by the joinder of the plates and side rails of FIG. 2 may be seen to form a continuously arcuately formed surface. Any arcuate form may be employed, but in order to derive maximum advantage from the strength to be gained from formed shapes—or, in other words, to obtain maximum strength from a minimum amount of materials and to derive the greatest energy savings—the half-circle arcuate form is preferred.

Figure 3:
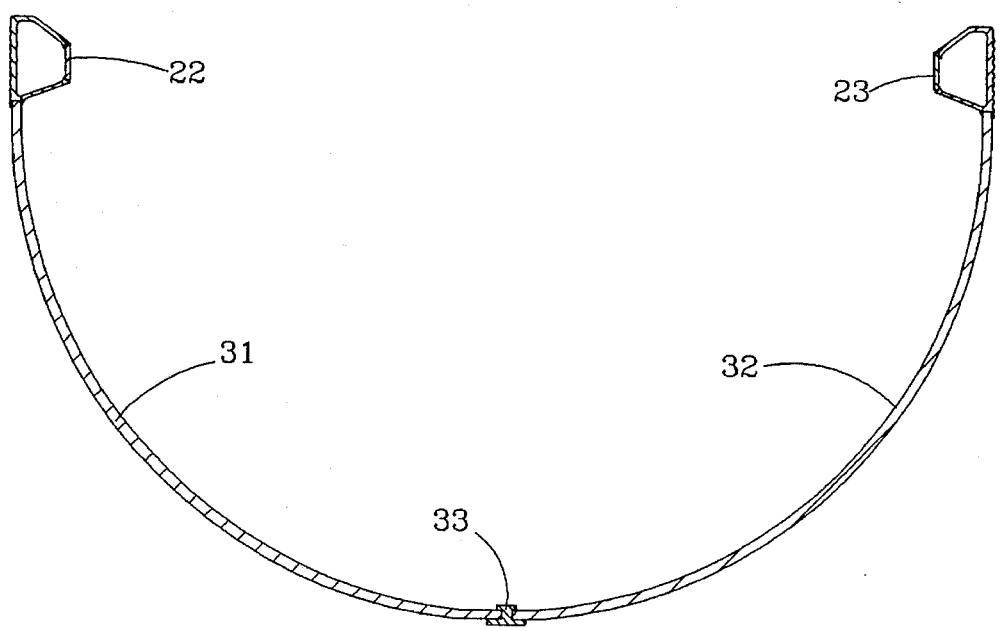
FIG. 3 is a similar schematic of a two-plate variant of such general configuration.

FIG. 3 depicts a two-plate variant in schematic cross-section. As may be seen, this embodiment has no floor plate per se; rather, plates 31 and 32 each integrally form a side wall and approximately half of the bottom of the final body shell. Plates 31 and 32 may be joined to bottom rail 33 similarly to the manner described above for joinder of side rails to plates. Top rails 22 and 23 may also similarly be joined, and may similarly provide the requisite degree of stiffness or resistance to excess inward deformation.

Figure 4:
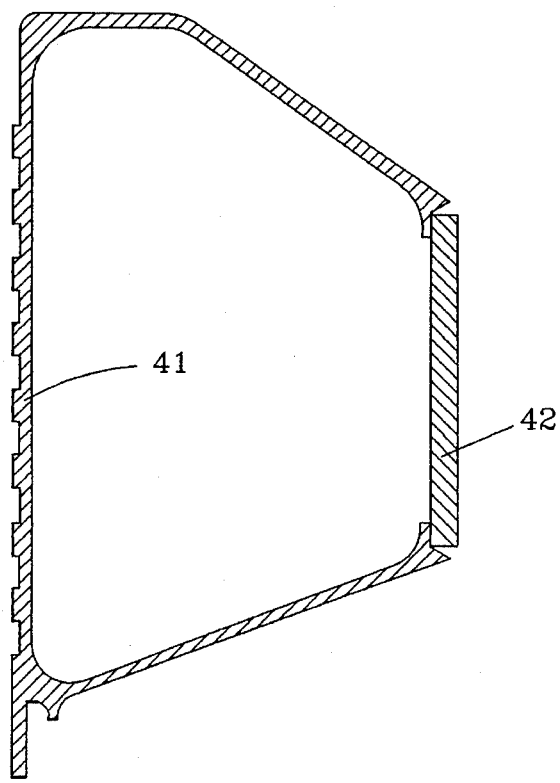
FIG. 4 is a larger scaled, cross-sectional view of the preferred form of a top rail.

FIG. 4 is an enlarged cross-sectional view of a preferred form of top rail. While many variations of top rails are perfectly satisfactory, the preferred embodiment is noteworthy for at least two reasons. As alluded to above, strong, lightweight materials such as aluminum tend to be not only highly elastic but extremely flexible when formed in long, thin, unsupported panels, and for many applications such excessive flexing is deemed deleterious. Close inspection of the top rail of FIG. 4 will reveal that its height is not multiple times its width, as would be expected, and that its width is unexpectedly large. A configuration on this general order and sized at roughly 8 by 10 inches will provide a moment of inertia with respect to an imaginary vertical plane through its neutral axis on the order of magnitude of 6 quartic inches (in.$^4$). Experimentation has established that moments of inertia of around 3 in.$^4$ are insufficient to provide sufficient stiffness, while moments of 6 in.$^4$ or so are quite adequate. It is to be understood that the larger such top rails, the greater the degree of stiffness that can be obtained at, however, the penalty of additional weight. An apparently optimum combination can be achieved with a top rail of moment of inertia of around 6 in.$^4$ when combined with pre-tensioning of one component of such top rails. As viewed in FIG. 4, surface 41 is suitable for the exterior of a top rail, while element 42 will suitably comprise the interior of such rail. Element 42 may most simply take the form of a flat bar, and may be formed from material similar to that of the remainder of the rail or from material of lesser intrinsic elasticity. A preferred means of pre-tensioning such bar—i.e., of placing bar 42 in tension prior to affixing it to the remainder of the structure of top rail 22—is to tack weld one end of bar 42 to the corresponding end of rail 22, and then, for a full-length rail, to stretch such bar approximately 0.5 inch or so. If the tensioned bar 42 be then clamped firmly to rail 22 and welded, riveted, or otherwise attached to said rail, it will, upon release, cause the composite rail to bow outwardly. Steel, however, may not ordinarily be welded to aluminum, and should a steel flat bar be used with an aluminum extrusion, mechanical means of joinder should be employed. For the heaviest of applications with the full-length embodiment e.g., for a 38-ft. trailer with a 28-ton payload—the sides of a halfround or similar open arcuate-bottomed vessel tend to bow inwardly excessively at the top of such vessels. A top rail of moment of inertia of on the order of 6 quartic inches and with an inner member thereof suitably pre-tensioned will adequately resist such inward flexing. In fact, such a configuration will cause the unloaded vessel to bow outwardly slightly and result in a straight sidewall when loaded.

Figure 5:
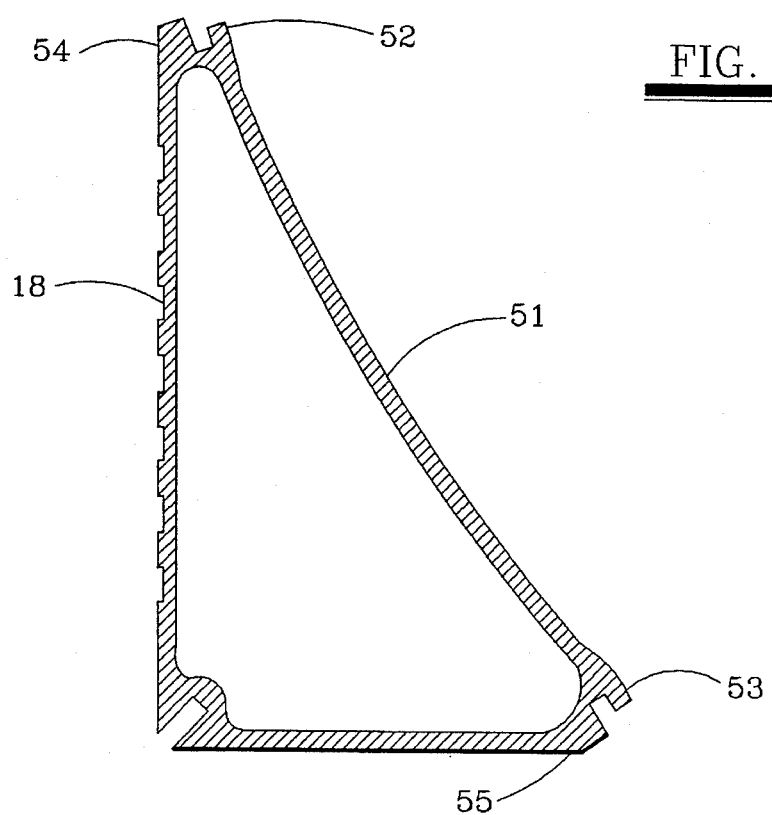
FIG. 5 is a larger scaled, cross-sectional view of a preferred side rail.

FIG. 5 is also a cross-sectional view, of a typical side rail such as rail 18. As noted previously, an idealized design will incorporate surface 51 as a portion of the interior surface of the vessel, rather than being overlapped substantially by a plate of such vessel, but the latter arrangement may be utilized if desired. Also in an ideal form of such an integral plate portion/supporting member, lips 52 and 53 will not extend as far as their respective underlying support members 54 and 55 if the plates are to be joined to side rail 18 by welding. When lightweight metals are welded, their weakest regions tend to be adjacent the welds; by having the lips on the inner surfaces shorter than that of the underlying support members, the weak regions adjacent the inner welds may be supported by material (at 54 and 55) which still possesses its full strength, resulting in a significantly stronger overall structure.

Figure 6:
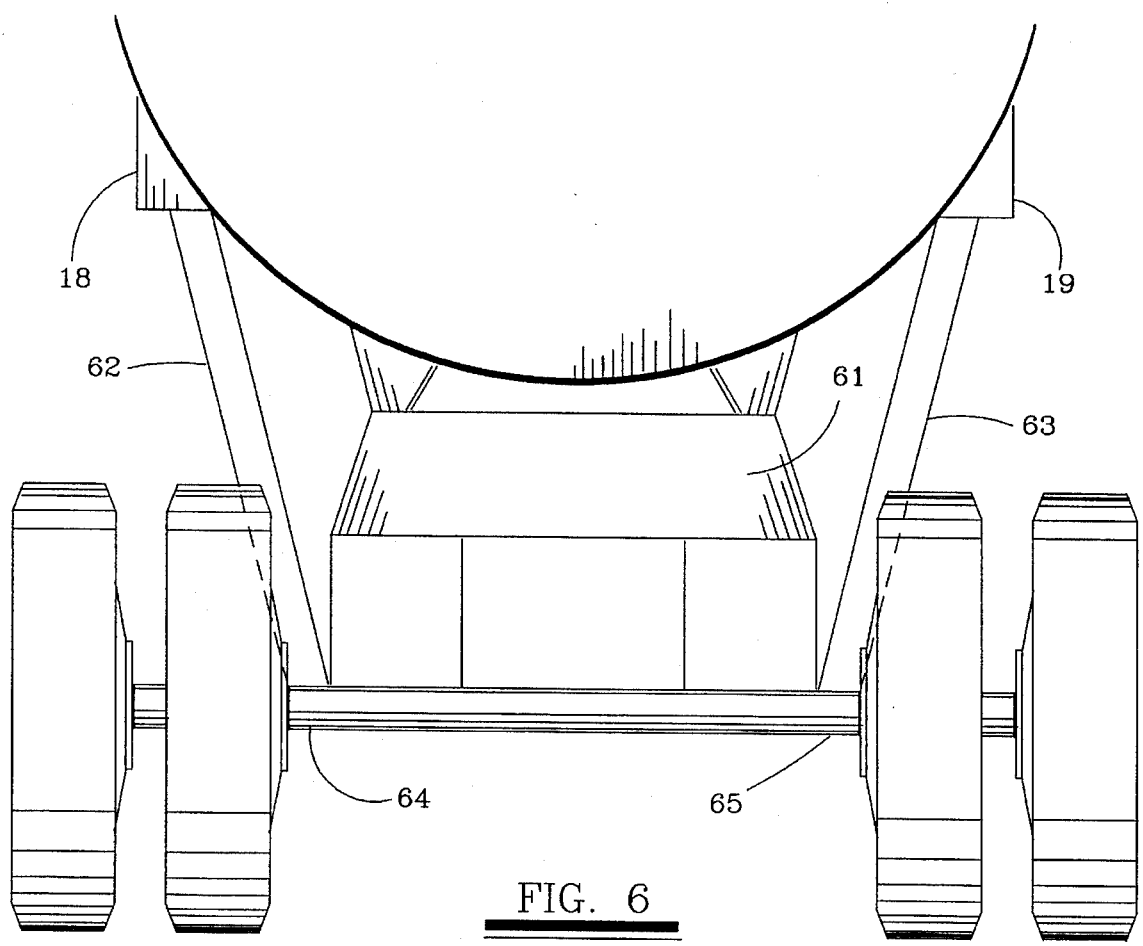
FIG. 6 is a highly schematic cross-sectional view of the three-plate embodiment of FIG. 1, taken at line 6—6, shown attached to one form of a suspension system.

FIG. 6 is a highly schematic cross-sectional view of the three-plate structure of FIG. 1, shown attached to a suspension system. The particular suspension system 61 illustrated schematically is the type known in the trade as an air ride suspension system. Maximum torsional rigidity when unloading or maximum resistance to rotation about the longitudinal axis with a minimum amount of supporting material may be achieved by attaching stablizing struts 62 and 63 to the outermost elements of the particular suspension system employed. In the instance of an air suspension, the lower ends of these stabilizing struts are preferably connected to the outermost portions of hangars 64 and 65, respectively. Should a conventional spring suspension system be employed, the lower ends of stabilizing struts 64 and 65 would be connected to the outermost portions of the trunion tubes typically employed with such suspensions, or even to specially fabricated extensions of such trunion tubes. In either event, the upper ends of struts 62 and 63 may preferably be connected to side rails 18 and 19 which represent the effectively outermost portions of the body of vehicle 10. The same principles should be followed where appropriate for all versions.

Figure 7:
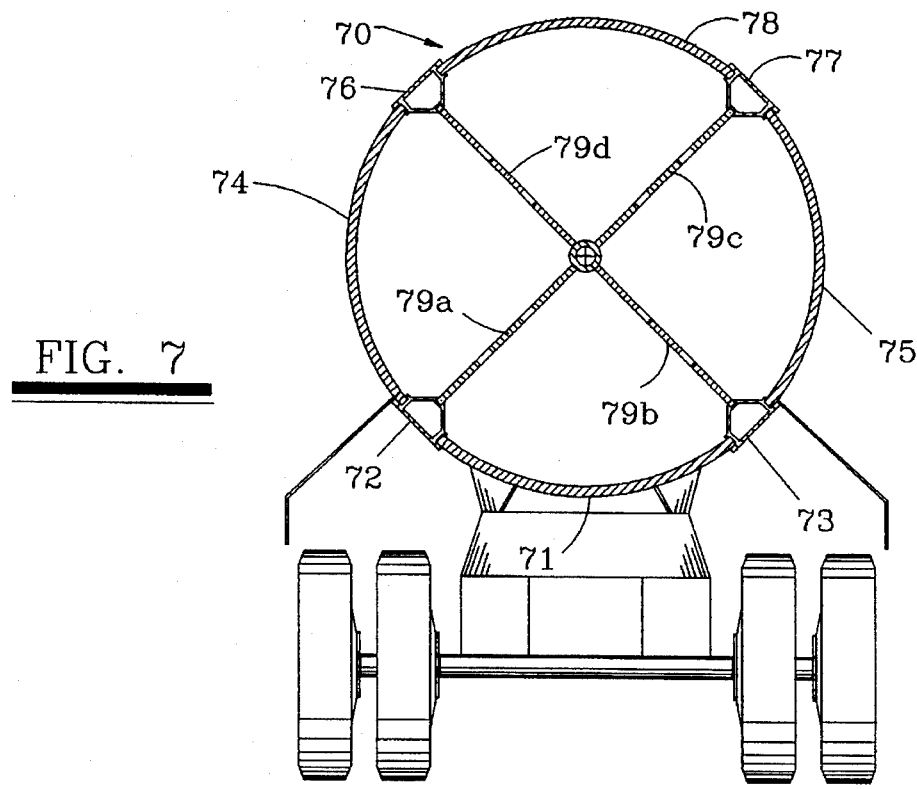
FIG. 7 is a cross-sectional view of a unitary or closed form of the present invention.

FIG. 7 is a cross-sectional view of a unitary structure 70 formed according to the precepts of the present invention. As such, it is suitable for use in many forms of closed vessels, such as railroad tank cars, oil field 'mud' or vacuum trucks, tank trailers and the like. Attachment to suspension systems will be apparent to those skilled in the art having the benefit of the teachings of the present invention.

Plate 71 may be a full length floor plate formed as disclosed hereinabove and connected to side rails 72 and 73 as previously taught. For such applications, however, it will usually be preferable for such integral plate/support members to be situated interior to rather than exterior to the vessel 70. Side walls 74 and 75 may be similarly connected and preferably are full width plates which may be similarly affixed to additional side rails 76 and 77. The latter, in turn, are similarly joined to top plate 78. The resulting extremely light but very strong vessel may frequently be employed to transport liquids and slurries. When so employed, it may be convenient to utilize a series of baffles 79a–d disposed about a central pipe or other suitable support member. The vessel may be closed by conventional domed ends (not shown) and accessed by conventional valves (not shown) conventionally situated.

Figure 8:
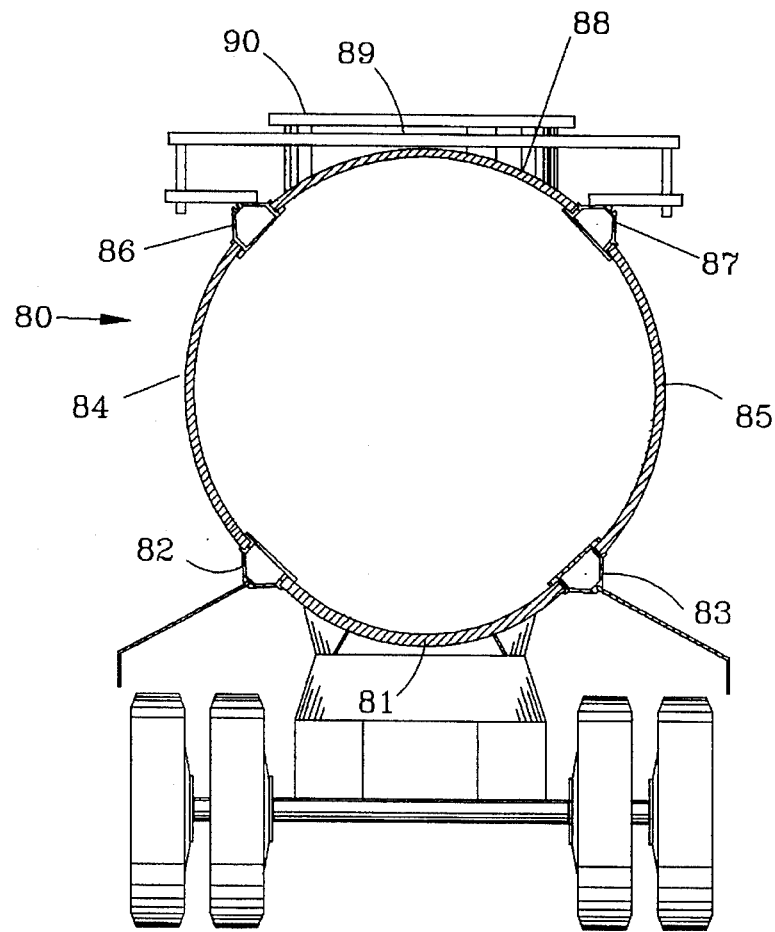
FIG. 8 is an end view of another form of a closed or unitary embodiment of the present invention.

FIG. 8 is an end view of another unitary structure 80 formed according to the principles of the present invention. It is suitable for application whenever unobstructed internal space in a light but strong vessel is desired, such as refuse collection/transfer vehicles, rail cars or the like. Bottom plate 81 and lower side rails 82 and 83 may be formed and attached as explained hereinbefore, as may side plates 84, 85, upper side rails 86, 87 and top plate 88. All four wall plates may be formed to the same arcuate radius as illustrated, or only opposite pairs may be formed to the same radius, thereby allowing the final structure to take on a variety of shapes as may be desired. Again it should be noted, however, that the strength/weight ratio may be maximized if all radii are the same. As most such vessels will be used to transport light but bulky materials, compacting means (not shown) and perhaps unloading means other than gravity may be required. In either event, access to an end of a vessel such as 80 frequently will be required, which can readily be provided by a gate or lid 89 which may pivot to a position above vessel 80. For some applications top access 90 may also be required. It is to be understood that such vessls may be mounted to a truck frame, to a trailer or rail suspension or to other systems as may be desired. Should vessels of this type be utilized for the rail transport of bulky materials (such as refuse) on a large scale, it may be economical to utilize a tipper at the receiving land fill to elevate each rail car and dump the contents therefrom.

Other alternate forms of the present invention will suggest themselves from a consideration of the apparatus and principles hereinbefore discussed. Accordingly, it should be clearly understood that the systems and techniques depicted in the accompanying drawings and described in the foregoing explanations are intended as exemplary embodiments of the invention and not as limitations thereto.

What is claimed is:

1. An improved lightweight open dump body of the type supportable near the ends thereof, comprising:

a transversally arcuate, longitudinal body fixedly joined at one end to a first closure member and openably joined at the other end to a second closure member, said body comprising a seamless center panel extending substantially the length of said body and joined to a pair of support rails in turn joined to a pair of seamless side panels, whereby said body adequately supports itself throughout its length without the use of circumferential support members along said body.

2. The improved dump body of claim 1, wherein said body is further supported by a rigid connection between a side support thereof and an outer portion of an axle assembly supporting said dump body, whereby torsional motion of said body may be minimized during loading, unloading and transit.

3. The improved dump body of claim 1, wherein each of said side panels is supported at its upper edge by a top rail extending substantially the length of said side panel.

4. The improved dump body of claim 1, wherein each of said side panels is supported at its upper edge by a top rail assembly having a moment of inertia with respect to a vertical plane through the neutral axis of said assembly of from three to twelve quartic inches.

5. The improved dump body of claim 4, wherein said moment of inertia is from about five quartic inches to about eight quartic inches.

6. The improved dump body of claim 4, wherein said moment of inertia is about six quartic inches.

7. The improved dump body of claim 1, wherein each of said panels is supported at its upper edge by a pre-tensioned top rail assembly, thereby causing said rail assembly to bulge outwardly when not under load and better resist excessive inward deformation when under load.

8. The improved dump body of claim 1, further comprising external means for elevating one end of said dump body from above or near the horizontal center plane of a load within said body.

9. An improved lightweight open dump body of the type supportable near the ends thereof, comprising:

a transversally stressed, longitudinal body fixedly joined at one end to a first closure member and openably joined at the other end to a second closure member, said body comprising a seamless center panel and a pair of seamless side panels extending substantially the length of said body and supported near their lower edges by a pair of support rails and near their upper edges by a pair of top rails, whereby said body adequately supports itself throughout its length without the use of circumferential support members along said body.

10. In an improved open dump body at least partially circumscribed by a top rail assembly, said assembly comprising an initially unstressed outer rail portion supported by means for receiving an initially tensioned inner rail portion, whereby said rail assembly will bow outwardly upon joinder of said inner and outer rail portions and release of said initial tension.

11. The rail assembly of claim 10, further comprising integral means for receiving an edge portion of a body panel of said dump body and constraining the freedom of motion of said edge portion in at least three directions, whereby the connection therebetween may be made effectively a rigid connection by intermittent joinder of said rail assembly and said body panel edge portion.

12. An improved lightweight open dump body of the type supportable near the ends thereof, comprising:

a transversally arcuate, longitudinal body fixedly joined at one end to a first closure member and openably joined at the other end to a second closure member, said body comprising a pair of seamless panels extending substantially the length of said body and joined at their lower edges, each of said seamless panels being supported near its upper edge by a top rail and being supported in the vicinity of its lower edge by a bottom rail, whereby said body adequately supports itself throughout its length without the use of circumferential support members along said body.

13. The improved dump body of claim 12, further comprising a side rail supporting a portion of each seamless panel intermediate said bottom rail and said top rail.

14. The improved dump body of claim 13 wherein said body is further supported by a rigid connection between a side support thereof and an outer portion of an axle assembly supporting said dump body, whereby torsional motion of said body may be minimized during loading, unloading and transit.

15. The improved dump body of claim 12 wherein each of said plates is supported at its upper edge by a pretensioned top rail assembly, thereby causing said rail assembly to bulge outwardly when not under load and better resist excessive inward deformation when under load.

16. The improved dump body of claim 12 wherein each of said panels is supported at its upper edge by a top rail assembly having a moment of inertia with respect to a vertical plane through the neutral axis of said top rail assembly of from three to twelve quartic inches.

17. The improved dump body of claim 16 wherein said moment of interia is from about five quartic inches to about eight quartic inches.

18. The improved dump body of claim 16 wherein said moment of inertia is about six quartic inches.

19. The improved dump body of claim 12, further comprising external means for elevating one end of said dump body from above or near the horizontal center plane of a load within said body.

20. An improved dump truck of the type supported by a truck frame, comprising:

a transversally arcuate, longitudinal body fixedly joined at one end to a first closure member and openably joined at the other end to a second closure member, said body comprising a pair of seamless panels extending the length of the body and joined at their lower edges, each of said seamless panels being supported near its upper edge by a top rail and being supported in the vicinity of its lower edge by a bottom rail, whereby said body adequately supports itself throughout its length without the use of circumferential support members along said body.

21. The improved dump truck of claim 20, further comprising a side rail supporting each seamless panel intermediate said bottom rail and said top rail.

22. An improved dump truck of the type supported by a truck frame, comprising:

a transversally arcuate, longitudinal body fixedly joined at one end to a first closure member and openably joined at the other end to a second closure member, said body comprising a seamless center panel joined to a pair of support rails in turn joined to a pair of seamless side panels extending the length of the body and supported on opposing edges by a pair of top rails, said body being further supported by a pair of bottom rails, whereby said body adequately supports itself throughout its length without the use of circumferential support members along said body.

* * * * *